United States Patent [19]

Burr

[11] Patent Number: 4,938,043
[45] Date of Patent: Jul. 3, 1990

[54] INHIBITOR FOR COINCIDENTAL LOCK

[75] Inventor: Larry W. Burr, Saginaw, Mich.

[73] Assignee: General Motors Corporation, Detroit, Mich.

[21] Appl. No.: 351,107

[22] Filed: May 12, 1989

[51] Int. Cl.$^5$ .............................................. B60R 25/02
[52] U.S. Cl. ....................................... 70/252; 70/186
[58] Field of Search ......................... 70/185, 186, 252

[56] References Cited

U.S. PATENT DOCUMENTS

| | | | |
|---|---|---|---|
| 3,648,490 | 3/1972 | Kimberlin et al. | 70/186 |
| 3,673,829 | 7/1972 | Mizuno | 70/252 |
| 3,702,550 | 11/1972 | Shimizu | 70/252 |
| 3,789,636 | 2/1974 | Nakashima | 70/252 |
| 3,828,594 | 8/1974 | Yamamoto | 70/252 |
| 3,916,658 | 11/1975 | Barry | 70/252 X |
| 4,029,168 | 6/1977 | Kramer | 180/114 |
| 4,332,306 | 6/1982 | Turatti | 70/252 X |
| 4,487,042 | 12/1984 | Mochida et al. | 70/186 |

Primary Examiner—Robert L. Wolfe
Assistant Examiner—Suzanne L. Dino
Attorney, Agent, or Firm—Saul Schwartz

[57] ABSTRACT

An inhibitor in an automobile steering column eoincidental lock of the type having a stationary armored sleeve and a key controlled barrel in the sleeve rotatable in an unlocking direction from a LOCK position to and through an OFF position and in a locking direction from the OFF position to the LOCK position. The inhibitor includes a stepped annular shoulder on the barrel facing an annular end face on the sleeve, a blocking pin on the sleeve biased against the annular end face, and a release pin on the barrel adjacent the step in the annular shoulder. The blocking pin intercepts the step in the annular shoulder in the OFF position of the barrel to prevent attainment of the LOCK position. A finger button on the barrel is depressed by the driver to move the release pin to an extended position pushing the blocking pin into the sleeve out of the way of the step to permit rotation of the barrel to its LOCK position. The inhibitor cannot be defeated by pushing the finger button ahead of the OFF position of the barrel.

5 Claims, 2 Drawing Sheets

INHIBITOR FOR COINCIDENTAL LOCK

FIELD OF THE INVENTION

This invention relates to inhibitors in coincidental ignition/steering shaft locks on automobile steering columns.

BACKGROUND OF THE INVENTION

Typical coincidental locks on automotive steering columns include a stationary armored cylinder and a barrel in the cylinder rotatable relative to the latter when a correct key is inserted in a slot in the barrel. The barrel is connected to a steering shaft lock and to an ignition switch and has a lock position in which the key can be withdrawn, the steering shaft is locked against rotation, and the ignition is off. The barrel also has several operative positions in which the key cannot be withdrawn, the steering shaft is unlocked and freely rotatable, and the ignition is in one of its operative states such as engine-start or engine-run. Prior coincidental locks also include inhibitors which require the driver to perfrom an independent hand or finger movement as ratification of the driver's decision to turn the key to the lock position of the barrel. One example, described in U.S. Pat. No. 4,029,168, issued 14 Jun. 1977 to R. L. Kramer and assigned to the assignee of this invention, includes a finger operated lever on the side of the steering column which must be depressed to unblock linkage connected to the lock barrel. Other inhibitors take the form of plates or like elements which are moved by barrel rotation to positions preventing return rotation until the blocking element is manually moved out of the way. Still another inhibitor includes a cam rotatable with the barrel and a fork-like follower which rides on the cam. The follower prevents return rotation of the barrel to its lock position by engaging the side of an abutment on the cam until the rod is manually pushed to move the follower out of the way of the abutment. An inhibitor according to this invention includes simple pins for blocking and releasing the barrel and cannot be defeated by continuous depression of the finger operated element during rotation of the barrel toward its lock position.

SUMMARY OF THE INVENTION

This invention is a new and improved inhibitor in a coincidental ignition/steering shaft lock on an automotive steering column, the coincidental lock having a stationary armored sleeve on the steering column and a key controlled barrel rotatable in the sleeve between LOCK and OFF positions corresponding, respectively, to rotatably locked and rotatably unlocked conditions of the steering shaft. The inhibitor according to this invention includes a stepped annular shoulder on the barrel, a blocking pin on the sleeve biased against the annular shoulder and engageable on a flat side of the step in the annular shoulder in the locking direction of rotation of the barrel before its LOCK position, and a release pin on the barrel adjacent the step in the annular shoulder. When rotation of the barrel is blocked by the blocking pin, the release pin is manually extended to a position coextensive with the step whereby the blocking pin is pushed into the armored sleeve out of the way of the step and the barrel is rotatable to its LOCK position. The release pin is operated by a finger button on the barrel. The step has a ramp on one side which cams the blocking pin over the step during rotation of the barrel in the unlocking direction. If the barrel is rotated in the locking direction and the finger button is pressed before the blocking pin intercepts the step, the blocking pin intercepts the release pin and prevents attainment of the LOCK position of the barrel.

DESCRIPTION OF A PREFERRED EMBODIMENT

Figure 1:
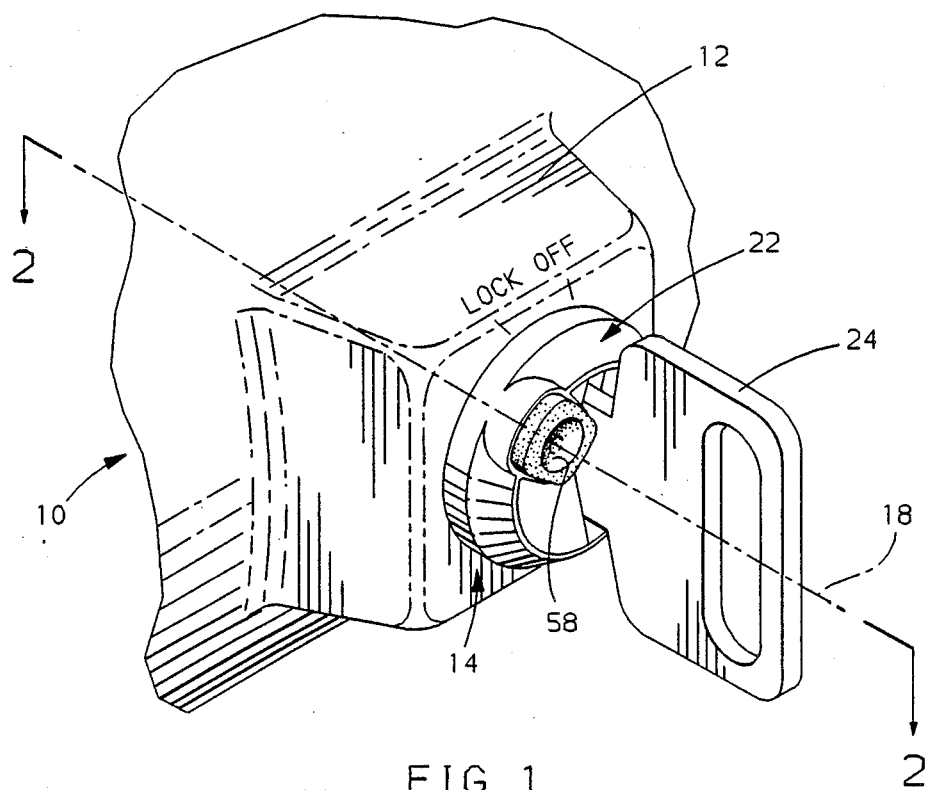
FIG. 1 is a perspective view of the front of a coincidental lock having an inhibitor according to this invention.
Figure 2:
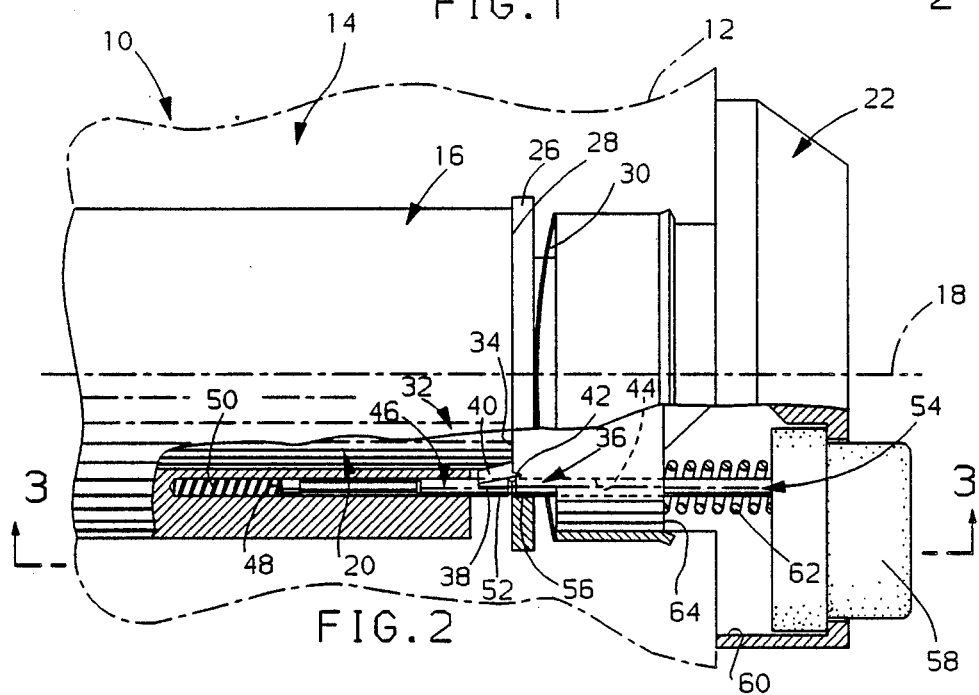
FIG. 2 is a sectional view taken generally along the planes indicated by lines 2—2 in FIG. 1.
Figure 3:
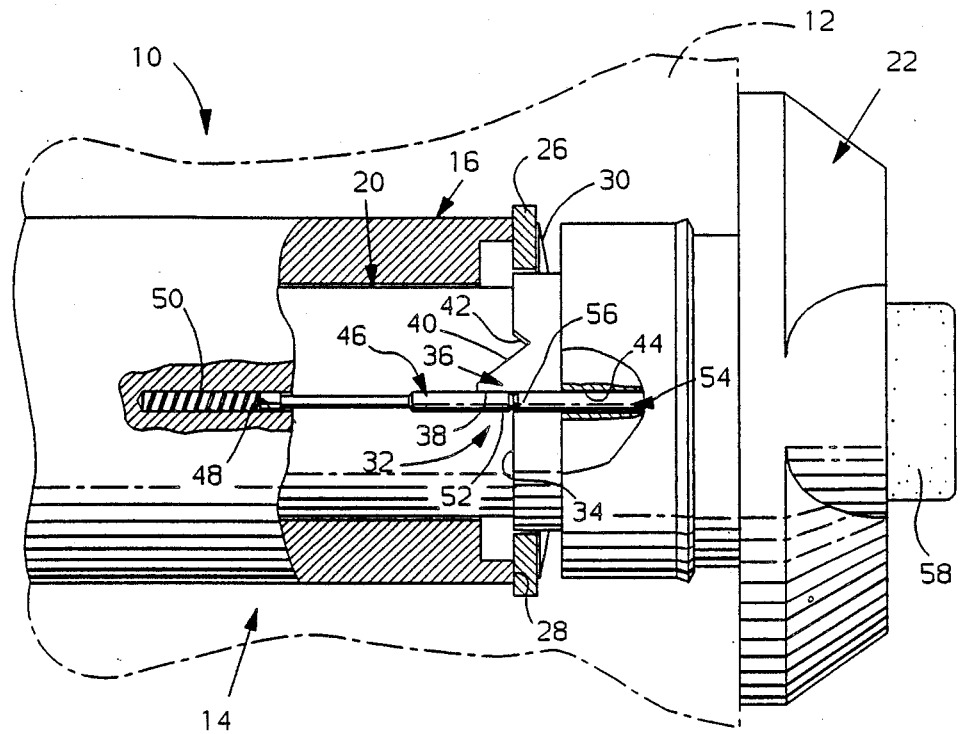
FIG. 3 is a partially broken-away view taken generally along the plane indicated by lines 3—3 in FIG. 2.

Referring to FIGS. 1-3, a fragmentarily illustrated steering column mast jacket 10 includes a lock housing portion 12 at a point on the mast jacket accessible by the driver's right hand. A coincidental lock 14 on the mast jacket 10 includes an armored sleeve 16 rigidly mounted on the mast jacket inside the housing 12 and aligned on a generally radial axis 18 of the mast jacket. The coincidental lock 14 further includes a barrel 20 rotatable within the sleeve 16 about the axis 18, a key bezel 22 outside the housing portion 12 and rotatable as a unit with the barrel 20, and a key 24. An armored washer 26 is disposed between the bezel and an annular end wall 28 of the sleeve 16. The washer has a hook, not shown, in a slot in the sleeve which prevents rotation of the washer but allows the same to float in the direction of axis 18. A wave spring 30 between the washer 26 and the bezel 22 biases the washer against the end wall 28 of the sleeve.

The barrel has a LOCK position wherein the key 24 is inserted and withdrawn from the barrel and an OFF position, FIG. 1, wherein the key cannot be withdrawn. The barrel 20 is connected to a steering shaft lock, not shown, and to the vehicle's ignition, not shown, such that in the LOCK position of the barrel the steering shaft is locked against rotation and the ignition is off and in the OFF position the steering shaft is unlocked and rotatable while the ignition is still off. The barrel has the usual additional operative positions beyond the OFF position corresponding to starting and sustaining the vehicle's engine. An inhibitor 32 according to this invention prevents rotation of the barrel 20 from the OFF position to the LOCK position until the driver ratifies the decision by executing a secondary finger movement in addition to the usual rotation of the key.

Figure 4:
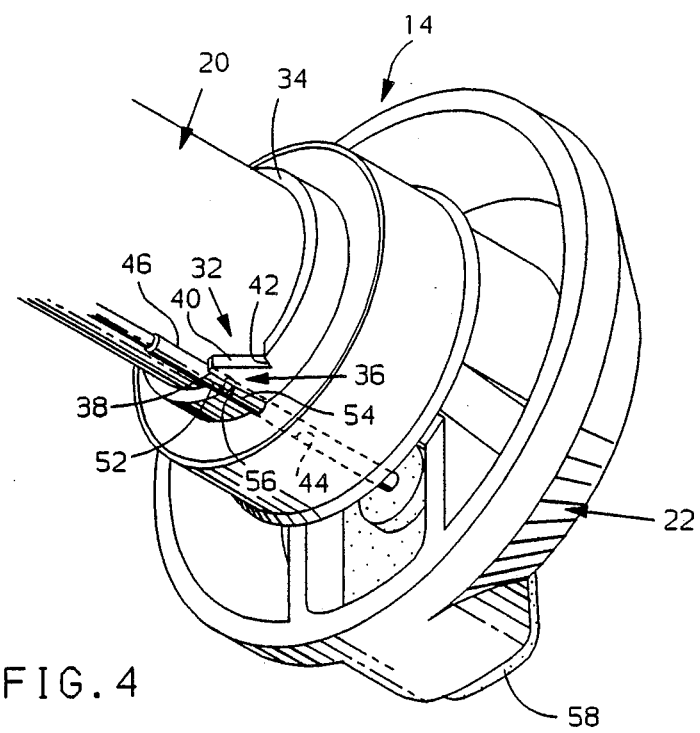
FIG. 4 is a perspective view of a portion of FIG. 3.

As seen best in FIGS. 2-4, the inhibitor 32 includes an annular shoulder 34 on the barrel 20 facing the end wall 28 on the sleeve 16. The shoulder 34 is interrupted by a step 36 bounded on one side by a flat side 38 perpendicular to the shoulder and on the other side by a ramp 40. At the base of the ramp, the shoulder 34 has a detent notch 42. Adjacent the flat side of the step, the shoulder is interrupted by a bore 44 in the barrel parallel to the axis 18.

The inhibitor 32 further includes a blocking pin 46 slidably disposed in a bore 48 in the sleeve 16 parallel to the axis 18. A spring 50 in the bore 48 below the blocking pin biases a distal end 52 of the pin against the annular shoulder 34 on the barrel. The step 36 is located relative to the bore 48 in the sleeve such that during locking rotation of the barrel the blocking pin intercepts the flat side 38 of the step in the LOCK position of the barrel. During unlocking rotation of the barrel, the blocking pin is cammed over the flat side 38 of the step by the ramp 40.

A release pin 54 of the inhibitor 32 is slidably disposed in the bore 44 in the barrel. The release pin 54 is axially aligned with the blocking pin 46 in the OFF position of the barrel and has a distal end 56 engageable on the distal end 52 of the blocking pin. The release pin is rigidly connected to a finger button 58 slidably disposed in a bore 60 in the key bezel 22, FIG. 2. A spring 62 around the release pin bears against a surface 64 on the barrel and against the button 58 whereby the button and release pin are biased to a retracted position, FIGS. 3 and 4, wherein the distal end 56 of the release pin is flush with the annular shoulder 34 on the barrel.

The inhibitor 32 operates as follows. To unlock the steering shaft and start the vehicle's engine, the driver inserts key 24 into the barrel 20 and rotates the key to and through the OFF position of the barrel. Concurrently, the blocking pin 46 is cammed over the step 36 by the ramp 40 between. The release pin 54 is held in its retracted position by spring 62 and does not interfere with rotation of the barrel 20 relative to the sleeve 16.

To turn the vehicle's engine off and to lock the steering shaft against rotation, the driver grasps the key 24 ajnd rotates it and the barrel 20 in the locking direction toward the LOCK position of the barrel. When the barrel achieves its OFF position, FIGS. 1-3, the blocking pin intercepts the flat side 38 of the step 36 and prevents continued rotation of the barrel in the locking direction.

After sensing the resistance to rotation of the barrel created by the blocking pin 46, the driver ratifies the decision to turn the key to the LOCK position of the barrel by extending a finger of the hand grasping the key 24 and depressing the button 58. Depressing the button moves the latter and the release pin from the retracted position to an extended position, not shown, wherein the release pin extends across the full height of the flat side 38 of the step 36. The distal end 56 of the release pin 54 pushes on the distal end 52 of the blocking pin 46 to push the blocking pin into the bore 48 in the sleeve and out from in front of the flat side of the step 36. With the button depressed, the driver finishes rotating the key to the LOCK position of the barrel and then withdraws the key. The driver senses attainment of the LOCK position when the distal end 52 of the blocking pin lodges in the detent notch 42 in the annular shoulder 34.

The inhibitor 32 can not be defeated by simply holding a finger on the button 58 while rotating the barrel in the locking direction toward its LOCK position. In that circumstance, the side of the blocking pin intercepts the side of the release pin just before barrel 20 achieves its OFF position and prevents further rotation of the barrel. The driver is then required to return the button and release pin to the retracted position, rotate the barrel to its OFF position, and then depress the button again to repeat the release sequence described above.

The embodiments of the invention in which an exclusive property or privilege is claimed are defined as follows:

1. In a steering column mounted coincidental lock including an armored sleeve rigidly supported on said steering column and defining an annular end wall and a key controlled barrel disposed in said sleeve for rotation relative thereto in an unlocking direction from a LOCK position to and through an OFF position and in a locking direction from beyond said OFF position to said LOCK position, an inhibitor comprising:
   means on said barrel defining an annular shoulder facing said annular end wall,
   a blocking means on said armored sleeve extending from said annular end wall and movable from a first position slidably engaging said annular shoulder to a second position substantially retracted within said annular sleeve,
   first spring means biasing said blocking means to said first position,
   means on said barrel defining a step in said annular shoulder having a flat side intercepted by said blocking means in said first position of said blocking means and in said OFF position of said barrel when said barrel is rotated in said locking direction from beyond said OFF position,
   a release means on said barrel adjacent said flat side of said step in said annular shoulder and movable between a retracted position withdrawn into said barrel and an extended position coextensive with said flat side,
   said release means in said OFF position of said barrel moving said blocking means from said first to said second position concurrently with movement of said release means from said retracted to said extended position and being intercepted by said blocking means before said OFF position of said barrel is attained when said barrel is rotated in said locking direction from beyond said OFF position and said release means is in said extended position,
   second spring means biasing said release means to said retracted position, and
   manual actuation means on said barrel connected to said release means for manually moving said release means from said retracted to said extended position.

2. The inhibitor recited in claim 1 and further including
   means on said barrel defining a ramp on said step in said annular shoulder operative to cam said blocking means from said first to said second position during rotation of said barrel in said unlocking direction from said LOCK position so that said blocking means does not interfere with rotation of said barrel in said unlocking direction.

3. The inhibitor recited in claim 2 wherein said blocking means includes
   a blocking pin slidably disposed in a bore in said armored sleeve and having a distal end slidably engaging said annular shoulder.

4. The inhibitor recited in claim 3 wherein said release means includes
   a release pin slidably disposed in a bore in said barrel adjacent said flat side of said step in said annular shoulder and having a distal end engageable on said distal end of said blocking pin during movement from said retracted to said extended position when said barrel is in said OFF position.

5. The inhibitor recited in claim 4 wherein said manual actuation means includes
   a finger button slidably disposed on said barrel and connected to said release pin for movement as a unit therewith.

* * * * *